United States Patent [19]

Fukuoka et al.

[11] 4,427,359

[45] Jan. 24, 1984

[54] INJECTION STRETCH-BLOW MOLDING MACHINE

[75] Inventors: Shigenori Fukuoka, Ichihara; Sadaharu Tsutsui, Yotsukaido; Toshio Matsumaru, Chiba, all of Japan

[73] Assignee: Sumitomo Heavy Industries, Ltd., Tokyo, Japan

[21] Appl. No.: 397,700

[22] Filed: Jul. 13, 1982

[30] Foreign Application Priority Data

Jul. 14, 1981 [JP] Japan .................................. 56-109749

[51] Int. Cl.³ .............................................. B29C 17/07
[52] U.S. Cl. ...................................... 425/525; 264/532; 264/535; 264/538; 425/526; 425/529; 425/533
[58] Field of Search ............... 425/525, 526, 529, 533, 425/534; 264/532, 535, 537, 538

[56] References Cited

U.S. PATENT DOCUMENTS

| | | | |
|---|---|---|---|
| 3,339,231 | 9/1967 | Piotrowski | 18/5 |
| 3,390,427 | 7/1968 | Ruekberg | 18/5 |
| 3,408,691 | 11/1968 | Ruekberg | 18/5 |
| 3,412,186 | 11/1968 | Piotrowski | 264/89 |
| 3,788,548 | 1/1974 | Hentsch | 239/132.3 |
| 3,850,562 | 11/1974 | Takeuchi et al. | 425/529 X |
| 3,941,539 | 3/1976 | Saumsiegle et al. | 425/242 |
| 3,944,643 | 3/1976 | Sato et al. | 264/538 X |
| 3,963,399 | 6/1976 | Zavasnik | 425/242 |
| 4,128,374 | 12/1978 | Saumsiegle et al. | 425/403 |
| 4,290,995 | 9/1981 | Coas | 264/532 |
| 4,344,749 | 8/1982 | Fritz et al. | 264/538 X |

*Primary Examiner*—Jan H. Silbaugh
*Attorney, Agent, or Firm*—Armstrong, Nikaido, Marmelstein & Kubovcik

[57] ABSTRACT

An injection stretch-blow molding machine for producing hollow articles such as bottles by simultaneously performing the formation of a parison by injection molding and sharping of the parison by stretch-blow molding. The machine has an injection mold constituted by a male mold part and a female mold part and a stretch-blow mold constituted by a male mold part and a female mold part. The machine further has four neck molds capable of opening and closing to release and clamp the neck of the parison and arranged on a rotary body at a 90° interval. The rotary body is rotatable to bring the neck molds successively through an injection position, heating position, blow position and a discharge position which are arranged at a 90° interval. As the rotary body makes the 90° intermittent rotation, the parison formed by injection in the injection position is brought by the neck mold to the heating position, and the preceding parison heated in the heating position is conveyed by another neck mold to the blow position to be finished by stretch-blow molding. At the same time, the finished article is conveyed by still another neck mold to the discharge position where the neck mold is opened to release the finished article.

3 Claims, 10 Drawing Figures

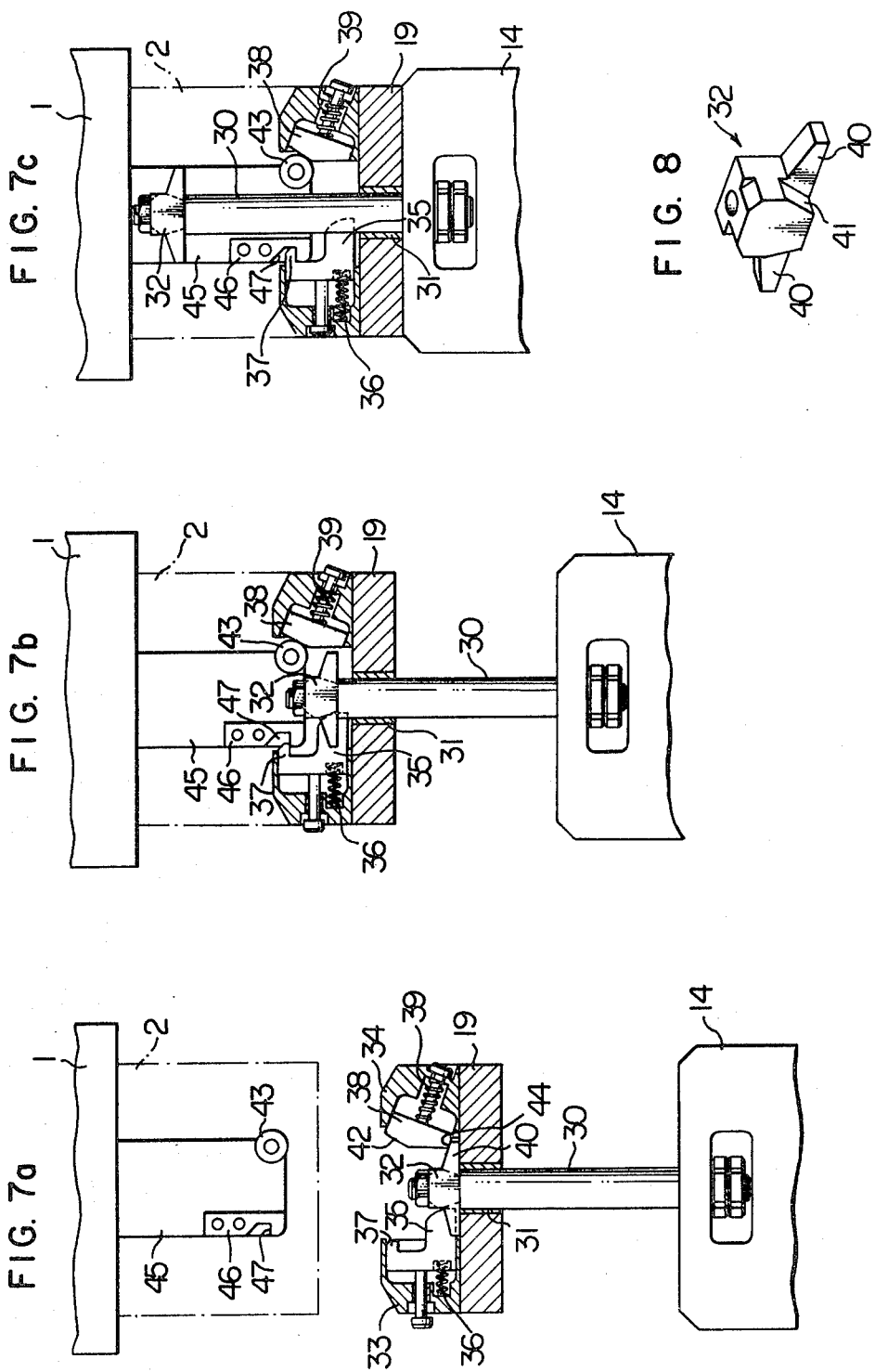

INJECTION STRETCH-BLOW MOLDING MACHINE

BACKGROUND OF THE INVENTION

The present invention relates to an injection stretch-blow molding machine for use in the production of hollow articles by a hot-parison method.

A typical conventional injection blow molding machine hitherto used for carrying out the hot-parison method employs injection female mold parts mounted on a stationary platen, blow female mold parts mounted on a movable platen and a carrier movably disposed between the both platens. A reversible body, carrying two rows male mold parts commonly used for injection and blow at a 180° offset from each other, is carried by the carrier to be intermittently rotated 180° in both directions around an axis which is perpendicular to the direction of movement of the carrier.

In operation, the injection and blow are achieved simultaneously by the injection molds and blow molds which are formed at both sides of the reversible body when the respective male and female mold parts are brought together. Then, as the reversible body is reversed after the separation of the male and female molds, parisons formed by the injection molding closely adhere to the male mold parts and are transferred by the latter to the blow female mold parts. After the respective male and female mold parts are again brought together, the parisons received in the blow molds are subjected to the blow molding. After the opening of the molds, the blown parisons are taken out as the final products.

The injection blow molding machine of the type described, having two stations one for injection and the other for blowing, offers the following advantages.

(a) Since the mold clamping at the injection station and the mold clamping at the blow station are made simultaneously with the common use of the single movable platen for both of injection and blow molds, the construction of the machine is made compact and the installation space is saved.

(b) During the blow, a force is applied by the blowing pressure to the blow female mold part to tend to open the blow mold. The frictional force resisting to this mold opening force is produced by the mold clamping force for the injection. Therefore, it is not necessary to employ a large-scale clamping device nor large clamping force for the blow mold.

On the other hand, however, the injection blow molding machine of the kind described suffers the following disadvantages.

(a) The male mold part, which is adapted to be used commonly for both of injection and blow, is provided with an air slit which is opened during the blow and closed during the injection. Therefore, the male mold part inevitably has a sliding portion. In order to eliminate any local thickening or thinning of the parison wall due to a play attributable to the presence of the sliding portion, it is absolutely necessary to fabricate the male mold part at a high precision. In consequence, the cost of the male mold part is raised uneconomically.

(b) The parison formed by the injection is adhered to the male mold part but the adhesion force is not uniform over the entire area of the parison. Therefore, during the blow, the parts of the parison are not uniformly separated away from the male mold part. In consequence, the parison is inflated non-uniformly to cause various defects such as non-uniformity of wall thickness in the final product.

(c) The male mold part, which is repeatedly used for the injection and blow, is gradually heated to a high temperature. This may cause a difference in the parison temperature between the period immediately after the start-up of the machine and the period after elapse of a long time after the start-up, resulting in an unstable molding characteristics.

SUMMARY OF THE INVENTION

Accordingly, an object of the invention is to provide an injection stretch-blow molding machine capable of eliminating the above-described problems of the prior art while maintaining the advantages of the conventional machine.

To this end, according to the invention, there is provided an injection stretch-blow molding machine comprising: a stationary platen; a movable platen movable linearly with respect to the stationary platen; a carrier disposed between the stationary platen and the movable platen and movable linearly with respect to the stationary platen; at least one injection female mold part attached to the surface of the stationary platen facing the carrier; at least one blow female mold part attached to the surface of the movable platen facing the carrier; an injection male mold part mounted on the carrier so as to oppose to the injection female mold part; a blow male mold part provided with a stretching bar and mounted on the carrier so as to oppose to the blow female mold part; a rotary body mounted on the carrier for rotation about an axis perpendicular to the direction of movement of the carrier; at least one neck mold adapted to open and close and radially movably mounted on the rotary body, the neck mold being biased radially outwardly; a neck mold operating means for opening and closing the neck mold; means for intermittently rotating the rotary body so that the neck mold can take alternatingly and repeatedly an injection position where it is aligned with the female and male injection mold parts and a blow position where it is aligned with the female and male blow mold parts; and a mold clamping means adapted to press the movable platen against the stationary platen with the carrier interposed therebetween thereby to strongly connect the female mold parts and male mold parts for injection and blow, respectively, through the medium of the neck mold.

According to the invention, independent male mold parts are used for the injection molding and stretch-blow molding, respectively. It is, therefore, possible to use, for the injection molding, a male mold part having a simple form such as a mere cylindrical form. In addition, it is comparatively easy to form a cooling water passage in the male mold part to effectively cool the latter. In consequence, it is possible to eliminate the aforementioned drawbacks in the conventional molding machine, i.e. the unstable molding characteristics due to the difference in the parison temperature between the period soon after the start-up of the machine and the period long after the start-up, attributable to the accumulation of heat in the male mold parts during long use of the machine. It is also to be noted that the parison can be formed to have a uniform wall thickness over the entire part thereof, because the injection male mold part does not have the air slit nor the stretching bar.

Furthermore, according to the invention, the injection male mold part and the blow male mold part are attached to the carrier at stationary positions. In operation, the parison is conveyed from the injection station to the blow station mainly by the neck mold. Therefore, no part of the parison sticks to the blow male mold part when the blow is commenced, so that the parison is inflated uniformly. According to the invention, therefore, it is possible to avoid lack of uniformity in the wall thickness of the product.

According to a preferred form of the invention, four neck molds are mounted on the rotary body at a 90° interval, and the rotary body is adapted to be intermittently rotated at 90° interval so that each neck mold can successively take four positions, i.e. an injection position, heating position, blow position and a discharge position. At the heating position, the parison formed by the injection is heated again for a heat treatment to further stabilize the quality of the product.

The above and other objects, features and advantages of the invention will become clear from the following description of the preferred embodiments taken in conjunction with the accompanying drawings.

BRIEF DESCRIPTION OF THE DRAWINGS

FIGS. 7a, 7b and 7c are enlarged views of a mechanism for carrying the neck mold mount used in the embodiment shown in FIGS. 5 and 6 showing operational phases of the mechanism, respectively; and FIG. 8 is an enlarged perspective view of the cam used in the mechanism shown in FIGS. 7a, 7b and 7c.

DESCRIPTION OF THE PREFERRED EMBODIMENT

Figure 1:
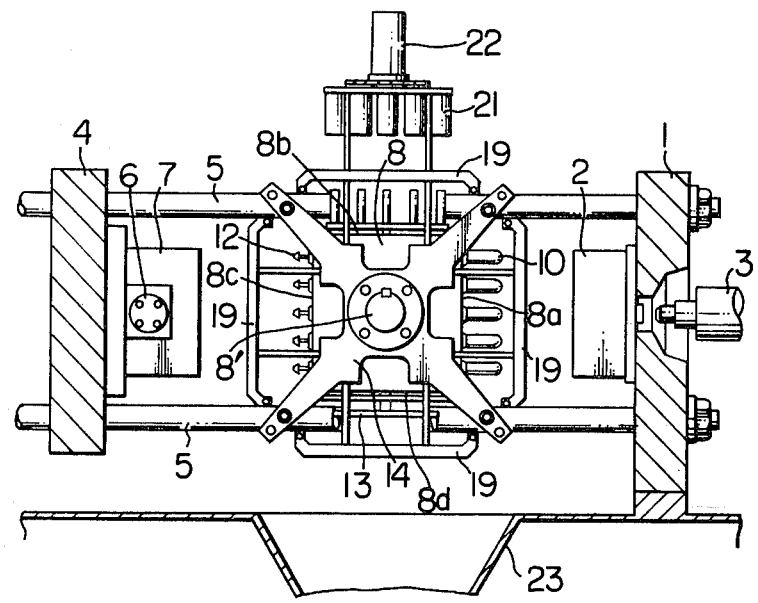
FIG. 1 is a side elevational view of an embodiment of an injection stretch-blow molding machine in accordance with the present invention.
Figure 2:
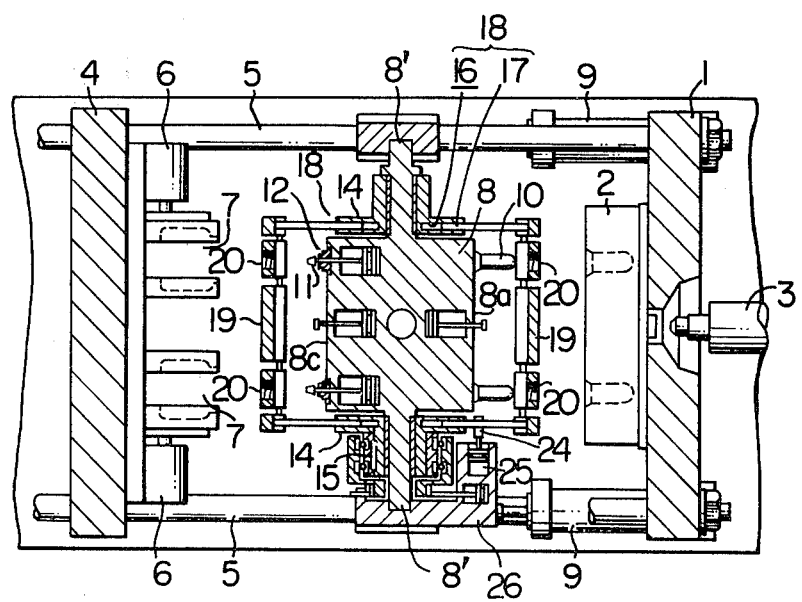
FIG. 2 is a plan view of the embodiment shown in FIG. 1 with a part thereof being shown in section.

An embodiment of an injection stretch-blow molding machine in accordance with the invention will be described with reference to FIGS. 1 and 2.

The molding machine includes a stationary platen 1 which is provided thereon with two rows of injection female mold parts 2, an injection device 3, and a movable platen 4 which is provided thereon with two rows of split type blow female mold parts 7 in alined relationship with said two rows of injection female mold parts 2 and which is slidable along tie bars 5 for movement toward and away from the stationary platen 1 by a mold clamping device (not shown). The blow female mold parts 7 in each row are adapted to be opened and closed by a mold operating device 6 mounted on the movable platen 4.

A reference numeral 8 designates a carrier disposed between the stationary platen 1 and the movable platen 4 and slidable along the tie bars 5 for movement toward and away from the stationary platen 1 by a hydraulic cylinder 9. The carrier 8 is provided with an injection station surface 8a, a heating station surface 8b, a blow station surface 8c and a discharge station surface 8d which are arranged at a 90° interval. Two rows of injection male mold parts 10 each of which is equipped therein with a cooling water conduit are mounted on the injection station surface 8a in alined relationship with the two rows of injection female mold parts 2. Two rows of blow male mold parts 12 each of which is provided with an axially slidable stretching bar 11 are mounted on the blow station surface 8c. On the discharge station surface 8d is mounted an operating device 13 for opening and closing neck molds 20 which will be described in detail later. Two mounting shafts 8', 8' project from the centers of the end surfaces of the carrier 8 in parallel with the direction of movement of the carrier and are attached to sliders slidable along the tie bars 5, 5.

Rotary bodies 14, 14 are rotatably held by the mounting shafts 8', 8' of the carrier 8 and are adapted to make a 90° intermittent rotation by the operation of a driving device 15 mounted on a support 26 connected to the carrier 8 and including a cam clutch, rack-pinion mechanism and a hydraulic cylinder. Each rotary body 14 has four station surfaces corresponding to the four station surfaces of the carrier 8. Two parallel cylinder bores 16 are formed in each rotary body 14 to open to each station surface of the rotary body 14 and in communication with pressurized fluid supply passages (not shown) formed in the carrier 8. Each cylinder bore 16 slidably receives a plunger 17 to constitute in combination with the latter a hydraulic or a pneumatic cylinder device 18 (hereinunder referred to simply as "cylinder device").

A neck mold mount 19 is attached to the free ends of the plungers of the four cylinder devices 18, 18 associated with each corresponding station surfaces of the rotary bodies 14, 14. On the neck mold mount 19 are mounted two rows of neck molds 20 each of which is of a split type and normally urged to be closed by, for example, springs (not shown). The neck mold mount 19 is adapted to be moved toward and away from the axis of the rotary bodies 14, 14 and normally held away from the carrier 8 with the cylinder devices 18.

A heating device 21 is supported on an upper part of the carrier 8, and is movable toward and away from the neck mold 20 by the operation of a pneumatic cylinder 22.

A chute 23 for discharging the molding articles is disposed under the discharge station surface 8d.

A reference numeral 24 designates a nock pin which is actuated by a cylinder 25 mounted on the support 26 to project upwardly into one of four bores (not shown) provided equiangularly on the lower rotary body 14 thereby detecting whether respective sets of neck molds 20 have been brought to positions in exact alignment with the associated mold parts and device at the injection, heating, blow and discharge stations 8a, 8b, 8c and 8d, respectively.

Although the embodiment described above is provided with two rows of mold parts, it will be understood that the embodiment may be modified to have one, three or more rows of mold parts.

The molding process with the injection stretchblow molding machine of the described embodiment will be described hereinunder with specific reference to FIGS. 3 and 4, in which for the simplification of the explanation, the machine includes only one set of male and female mold parts for injection and blow.

Figure 3:
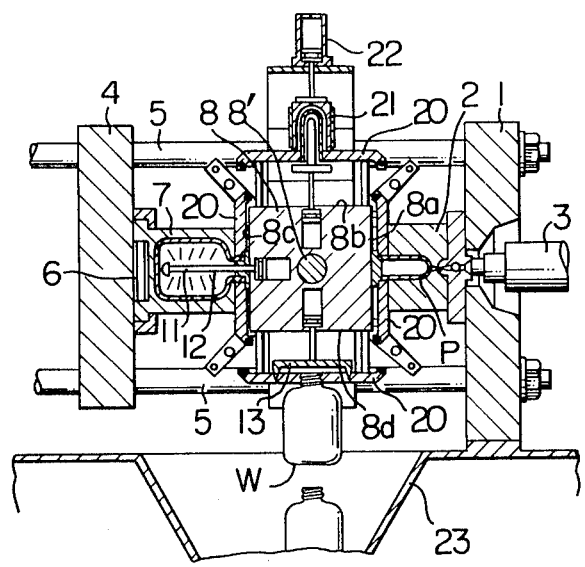
FIGS. 3 and 4 are sectional side elevational views of the injection stretch-blow molding machine in the state in which the mold parts are clamped and in the state in which the mold parts are separated, respectively.

Referring first to FIG. 3 showing the state in which the mold parts are clamped, the injection female mold part 2, the neck mold 20 and the injection male mold part 10 are clamped together on the injection station to form a cavity of a configuration conforming with that of a parison to be formed. A molten resin is injected into this cavity by the injection device 3 to form a parison P. Meanwhile, on the heating station, a parison P formed by the preceding injection is held by the neck mold 20 by which the parison P has been brought to this station. Then, the heating device 21 is moved ahead by the pneumatic cylinder 22 to surround the parison P to uniformly heat the latter to a temperature suitable for the stretch-blow. At the same time, a parison P which has uniformly been heated by the preceding heating device in the heating station has been brought to the blow station by the neck mold 20 and is held by the latter. In the blow station, the blow female mold part 7, neck mold 20 and a blow male mold part 12 are held together to form a cavity of a configuration conforming with the finished shape of the article to be molded. In the blow station, air is blown into the parison P while stretching the same by extending the stretching bar 11 of the blow male mold part 12. Finally, in the discharge station, the molded article W which has been formed by the preceding blow in the blow station and brought by the neck mold 20 is released to fall into the chute 23 as the neck mold 20 is opened by the operation of the neck mold operating device 13.

Figure 4:
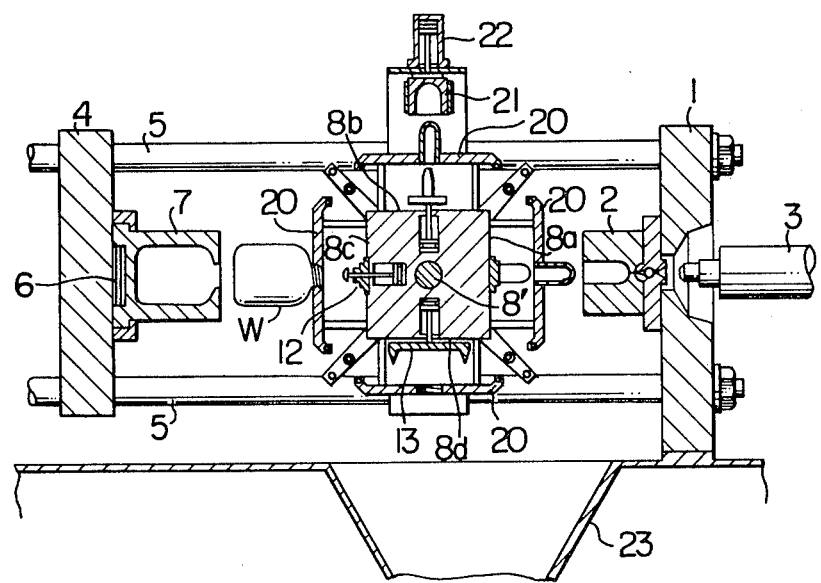

FIG. 4 shows the machine in the state after the mold parts have been separated upon completion of the each operation in the clamped state of the mold parts explained in connection with FIG. 3 and just before the 90° rotation of the neck molds 20 is made. In this state, the parison P formed by the injection is held by the neck mold 20 while, in the heating station, the heating device 21 has been raised to resume the starting position to permit the neck mold 20 holding the uniformly heated parison P to rotate. Meanwhile, in the blow station, the molded article W is held by the neck mold 20. At the same time, in the discharge station, the neck mold operating device 13 resumes the initial state to keep the neck mold 20 closed, after the discharge of the molded article W.

The driving device 15 is actuated in this state to rotate the rotary bodies 14 90° counter-clockwise, so that the parison P formed by the injection in the injection station is brought to the heating station, while the preceding parison P heated in the heating station is brought to the blow station. At the same time, the molded article stretched and blown in the blow station is moved to the discharge station. The convey of the parison and article is made by the neck mold 20. After the convey of the successive parisons and articles to next stations is finished, the nock pin 24 is actuated to detect whether the rotary bodies 14, 14 have brought the respective sets of neck molds 20 to correct positions. Then, if the nock pin 24 cannot enter into the hole of the rotary body, the position of the rotary body is adjusted until the pin 24 enters into the hole. Subsequently the carrier 8 and the movable platen 4 are moved ahead again in the clamping direction, so that the machine as a whole resumes the state as shown in FIG. 3 to prepare for the next cycle of operation. This operation is cyclically performed to produce the articles successively.

Although the injection stretch-blow molding machine of the described embodiment has four stations, this is not exclusive and the machine can have only two stations omitting the heating station and the discharge station. The arrangement of the machine having two stations, is substantially same as that of the described embodiment, except that the neck molds 20, 20 corresponding to the omitted stations, as well as the heating device 21 and the pneumatic cylinder 22, are dispensed with and the rotary bodies make 180° intermittent rotation.

The operation of such a modification having two stations will be explained briefly hereinunder. In the state in which the mold parts are clamped, a parison is formed by injection in the injection station. Meanwhile, in the blow station, the parison formed by the preceding injection is stretched and blown to become the molded article. After the completion of the injection and the blow, the mold clamping device is operated to separate the mold parts. In the injection station, the parison formed by injection is held by the neck mold and separated from the mold parts, while, in the blow station, the stretched and blown article is held by the neck mold and separated from the mold parts. Subsequently, in the blow station, the neck mold operation device is activated to drop the molded article onto the chute. The neck mold 20 is then closed again after the release of the molded article. Then, the rotary bodies are rotated 180° to bring the parison formed by injection in the injection station to the blow station by the neck mold while the empty neck mold is brought from the blow station to the injection station. Then, mold parts are clamped again so that the machine as a whole is reset to the starting condition to prepare for the next cycle of operation. This operation is cyclically repeated to produce articles successively.

Figure 5:
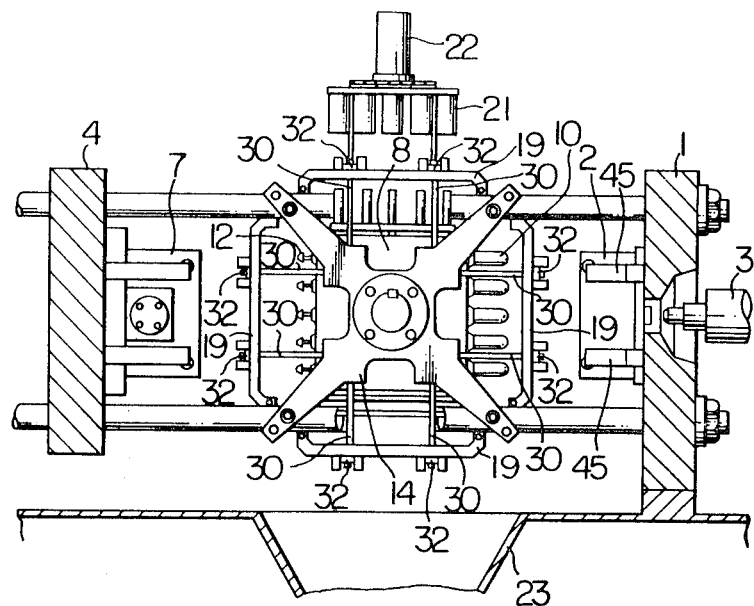
FIG. 5 is a side elevational view of another embodiment of an injection stretch-blow molding machine in accordance with the present invention.
Figure 6:
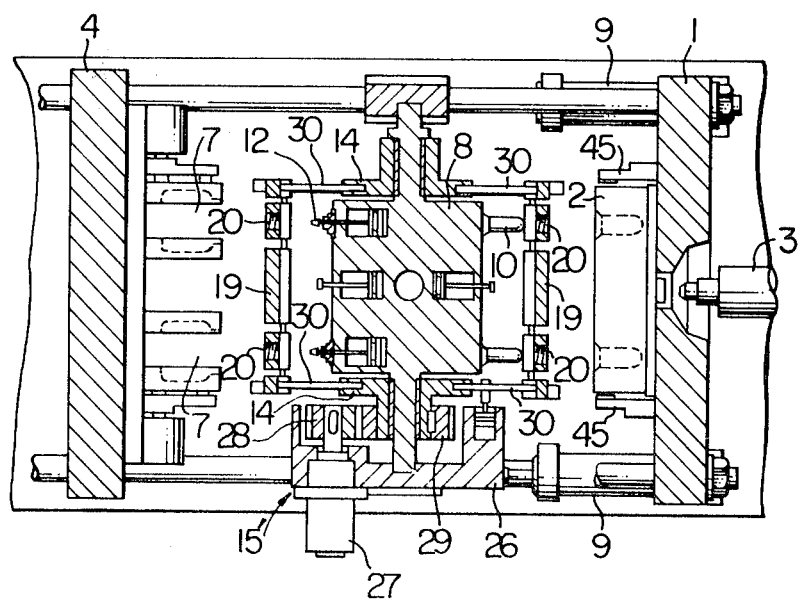
FIG. 6 is a plan view of the other embodiment shown in FIG. 5 with a part thereof being shown in section.

Referring to FIGS. 5 and 6, there is shown another embodiment of the present invention which is substantially same as the embodiment described with reference to FIGS. 1 to 4, except the construction of the driving device for effecting 90° intermittent rotation of the rotary bodies 14, 14 and means for supporting and operating the neck mold mount 19. The driving device 15' of this embodiment consists of a swing motor 27 with one way-clutch, which motor is mounted on the support 26 and has a driving shaft making 180° intermittent rotation with the clutch being engaged with and disengaged from the driving shaft in accordance with the directions of reciprocal rotation over 180° of the motor, a pinion 28 coupled to the driving shaft of the motor 27 and a gear 29 coupled to the boss of the lower rotary body 14 and in engagement with the pinion 28 to rotate at a velocity half of that of the pinion 28. Therefore, when the driving shaft of the motor 27 makes 180° intermittent rotation, the rotary body 14 makes 90° intermittent rotation.

In the embodiment of FIGS. 1 to 4 the neck mold mount 19 is fixedly attached to the free ends of the plungers of the cylinder devices 18, 18 as described, whereas in the embodiment of FIGS. 5 and 6 the neck mold mount 19 is arranged to be slidable along rods 30 fixedly mounted at their one ends on the bodies 14, 14. As shown in detail in FIGS. 7a, 7b and 7c, the neck mold mount 19 is provided with bushings 31, each slidably receiving each rod 30. Each rod 30 is provided with a cam 32 fixed to the free end thereof. On the neck mold mount 19 are mounted a first housing 33 at one side of the bushing 31 and a second housing 34 at the other side of the bushing 31. The first housing 33 slidably receives a first cam follower 35 laterally urged by a spring 36 into engagement with the cam 32 and having a hook 37. The second housing 34 receives a second cam follower 38 to be slidable in a direction slightly inclined with respect to the outer surface of the neck mold mount 19 and urged toward the cam 32 by a spring 39.

As shown in detail in FIG. 8, the cam 32 has at the front section, as viewed with FIGS. 7a, 7b and 7c, a pair of lateral projections 40 having slanted upper surfaces and at the rear section a cam surface 41 cooperating with the first cam follower 35. The second cam follower 38 has an inclined front surface 42 cooperating with a roller 43 and a lower surface 44 in sliding contact with the upper surface of the lateral projection 40 of the cam 32 when the cam 32 takes a position where the lower surfaces of the lateral projections 40 are in contact with the upper surface of the neck mold mount 19.

A bracket 45 is securely fixed to the stationary platen 1 and is provided with the roller 43 and a block 46 formed with a recess 47 with which the hook 37 of the first cam follower 35 is brought into engagement.

When the movable platen 4 and the carrier carrying the rotary bodies 14, 14 are in inoperative position as shown in FIGS. 5 and 6, the neck mold mount 19 is held at the free end of the rod 28 with the lateral projection 40 being clamped between the second cam follower 38 and the neck mold mount 19, while the first cam follower 35 is retracted against the spring 36 by the cam 32, as shown in FIG. 7a.

When the movable platen 4 and the carrier 8 are moved toward the stationary platen 1 and the second cam follower 38 has been brought into contact with the roller 43, the second cam follower 38 is retracted against the spring 39 and disengaged from the lateral projection 40 of the cam 37. When the carrier 8 is further moved toward the stationary platen 1, the cam 32 is moved away from the neck mold mount 19, which is now held stationary with the roller 43 in contact with the second cam follower 38, so that the first cam follower 35 is laterally forced toward the axis of the rod 30 by the spring 36 to bring the hook 37 into engagement with the recess 47 of the block 46 attached to the bracket 45 (See FIG. 7b).

Further movement of the carrier 8 accompanies the movement of only the rod 30 carrying at its free end the cam 32 and finally ceases at a position as shown in FIG. 7c at which the female mold parts 2 and the mole mold parts 10 are closed with clamping the neck molds 20 therebetween. (See FIG. 3).

In opening operation of the mold parts, the rotary body 14 carried by the carrier 8 is retracted from the position as shown in FIG. 7c while the rod 30 slides back through the bushing 31 of the neck mold mount 19 which is held stationary due to engagement of the hook 37 of the first cam follower 35 with the recess of the block 46. After the rotary body 14 has retracted to the position as shown in FIG. 7b, the first cam follower 35 is brought into engagement with the cam 32 and guided by the cam surface 41 thereof to retract against the spring 36 so that the hook 37 is disengaged from the recess 47 thereby to permit free movement of the neck mold mount 19. Thereafter when the cam 32 is moved back into contact with the upper surface of the neck mold mount 19, the second cam follower 38 is disengaged from the roller 43 and laterally forced by the spring 30 to slide on the upper surface of the lateral projection 40 of the cam 32 toward the axis of the rod 30 so that the projection 40 is clamped between the lower surface of the second cam follower 38 and the upper surface of the neck mold mount 19. In this manner the neck mold mount 19 is coupled with the cam 32 and retracted with the rotary body 14 to inoperative position.

This embodiment is advantageous as compared with the first embodiment of FIGS. 1 to 4, since no exclusive hydraulic device for operating the neck mold mount 19 is required.

As will be understood from the foregoing description, the injection male mold part is used exclusively for the injection molding and the cooling of the parison after the injection, but is never used for the convey of the parison nor for the stretch-blow. The injection male mold part, therefore, can have a simple cylindrical form and can be arranged to effect a sufficient cooling function. Accordingly, it is possible to eliminate the aforementioned disadvantage of the prior art, i.e. the difference in the parison temperature between the initial period soon after the start-up of the machine and the period after a long use which is inevitable in the conventional machine making the common use of a male mold part for both of injection molding and stretch-blow molding. Although not exclusive, the use of four stations is preferred because it permit a sufficiently uniform heating of the parison in the heating station to remarkably stabilize the molding characteristics. In addition, the parison can be formed to have a uniform wall thickness over the entire part thereof, because the injection male mold part in the machine of the invention is free of the sliding portion which is essential in the conventional injection male mold part equipped with a stretching bar and an air slit. The separate and distinctive use of the injection male mold part for the injection molding and cooling and the blow male mold part for the stretch-blow molding permits ideal molding cooling and uniform heating of the parison, while permitting a uniform stretch-blow molding. In consequence, articles of uniform wall thickness and having attractive appearance are produced at a high efficiency.

According to the invention, the neck molds 20 solely are circulated through successive stations to transfer the parisons P. Thus, the invention does not lose the advantage of the conventional injection stretch-blow molding machine in which the mold clamping is made simultaneously at both of the injection station and the blow station. In addition, the degree of complication of the machine construction, as well as the size of the machine as a whole, is not substantially changed from that of the conventional machine. In the conventional injection stretch-blow molding machine, a large-scale rotary body is required for carrying the male mold parts which are used commonly for both of the injection molding and stretch-blow molding. This problem, however, is completely eliminated by the present invention in which the carrier 8 for carrying male mold parts separately used for the injection molding and for the stretch-blow molding is held stationary, while the neck molds 20, which are comparatively easy to rotate, are rotated solely.

What is claimed is:

1. An injection stretch-blow molding machine comprising: a stationary platen; a movable platen movable linearly with respect to said stationary platen; a carrier disposed between said stationary platen and said movable platen and movable linearly with respect to said stationary platen; at least one injection female mold part attached to the surface of said stationary platen facing said carrier; at least one blow female mold part attached to the surface of said movable platen facing said carrier;

an injection male mold part mounted on said carrier so as to oppose said in injection female mold part; a blow male mold part provided with a stretching bar and mounted on said carrier so as to oppose said blow female mold part; a rotary body mounted on said carrier for rotation about an axis perpendicular to the direction of movement of said carrier; at least one neck mold adapted to open and close and radially movably mounted on said rotary body, said neck mold being biased radially outwardly; a neck mold operating means for opening and closing said neck mold; means for intermittently rotating said rotary body so that said neck mold can take alternatingly and repeatedly an injection position where it is aligned with said female and male injection mold parts and a blow position where it is aligned with said female and male blow mold parts; and a mold clamping means adapted to press said movable platen against said stationary platen with said carrier interposed therebetween thereby to strongly connect said female mold parts and male mold parts for injection and blow, respectively, through the medium of said neck mold.

2. An injection stretch-blow molding machine as claimed in claim 1, wherein two neck molds are mounted on said rotary body at a 180° interval and said rotary body is adapted to make a 180° intermittent rotation, and wherein said neck mold operating means is adapted to act on one of said neck molds taking said blow position after said mold clamping means is actuated to separate mold parts.

3. An injection stretch-blow molding machine as claimed in claim 1, wherein four neck molds are mounted on said rotary body at 90° intervals and said rotary member is adapted to make a 90° intermittent rotation so that said neck molds can successively take the four positions of said injection position, heating position rotated 90° from said injection position, said blow position and a discharge position rotated 90° from said blow position, said machine further comprising a heating means movable toward and away from said neck mold taking said heating position to surround and heat a parison held by said neck mold, and said neck mold operating means is adapted to act on said neck mold taking said discharge position.

* * * * *